(12) United States Patent
Overgaard et al.

(10) Patent No.: US 10,298,804 B2
(45) Date of Patent: May 21, 2019

(54) DISCRETE COLOR MATCHING IN A DOCUMENT SCANNER

(71) Applicant: Contex A/S, Allerød (DK)

(72) Inventors: Poul Overgaard, Hillerød (DK); Peter Nissen, Skævinge (DK); Gerard Verhaegh, Hillerød (DK)

(73) Assignee: Contex A/S, Allerød (DK)

( * ) Notice: Subject to any disclaimer, the term of this patent is extended or adjusted under 35 U.S.C. 154(b) by 0 days.

(21) Appl. No.: 14/913,154

(22) PCT Filed: Jun. 30, 2014

(86) PCT No.: PCT/EP2014/063862
§ 371 (c)(1),
(2) Date: Feb. 19, 2016

(87) PCT Pub. No.: WO2016/000744
PCT Pub. Date: Jan. 7, 2016

(65) Prior Publication Data
US 2017/0195511 A1    Jul. 6, 2017

(51) Int. Cl.
| | |
|---|---|
| *G06F 15/00* | (2006.01) |
| *H04N 1/193* | (2006.01) |
| *H04N 1/401* | (2006.01) |
| *H04N 1/48* | (2006.01) |
| *H04N 1/04* | (2006.01) |

(Continued)

(52) U.S. Cl.
CPC ......... *H04N 1/1933* (2013.01); *H04N 1/0405* (2013.01); *H04N 1/1903* (2013.01);
(Continued)

(58) Field of Classification Search
CPC .. H04N 1/1933; H04N 1/0405; H04N 1/1903; H04N 1/1917; H04N 1/401; H04N 1/48; H04N 1/60
(Continued)

(56) References Cited

U.S. PATENT DOCUMENTS

| | | |
|---|---|---|
| 5,430,559 A | 7/1995 | Hirota |
| 6,069,973 A | 5/2000 | Lin et al. |

(Continued)

FOREIGN PATENT DOCUMENTS

| | | |
|---|---|---|
| DE | 3636658 A1 | 4/1987 |
| DE | 10242516 A1 | 3/2004 |

(Continued)

OTHER PUBLICATIONS

International Preliminary Report on Patentability Received for PCT Patent Application No. PCT/EP2014/063862, dated Jan. 12, 2017, 8 pages.

(Continued)

*Primary Examiner* — Mark R Milia
(74) *Attorney, Agent, or Firm* — Morrison & Foerster LLP

(57) ABSTRACT

A method, and document scanner system, for correcting image values recorded by an optical document scanner with multiple color cameras arranged in a staggered configuration with overlap scan areas includes storing color correction values mapped to respective color index values, where a color correction value is computed from a color difference between a first color value and a second color value of the respective overlap sets, and correcting a third color value which is a color value from the second set of color image values by a color correction value which is looked up via a color index value determined from the third color value. Thereby color variations among staggered cameras are corrected.

18 Claims, 5 Drawing Sheets

(51) Int. Cl.
  *H04N 1/19* (2006.01)
  *H04N 1/191* (2006.01)
  *H04N 1/60* (2006.01)
(52) U.S. Cl.
  CPC ........... *H04N 1/1917* (2013.01); *H04N 1/401* (2013.01); *H04N 1/48* (2013.01); *H04N 1/60* (2013.01); *H04N 2201/0081* (2013.01); *H04N 2201/0414* (2013.01)
(58) Field of Classification Search
  USPC ........................................................ 358/523
  See application file for complete search history.

(56) References Cited

U.S. PATENT DOCUMENTS

| 2003/0147111 | A1 | 8/2003 | Steinebach |
| 2005/0254102 | A1 | 11/2005 | Kagami |
| 2007/0206244 | A1 | 9/2007 | Kobayashi |
| 2011/0032550 | A1 | 2/2011 | Torigoe |
| 2013/0286451 | A1* | 10/2013 | Verhaegh ............. H04N 1/1903 358/521 |

FOREIGN PATENT DOCUMENTS

| EP | 1033868 A1 | 9/2000 |
| JP | 2003219126 A | 7/2003 |
| WO | 2012/041390 A1 | 4/2012 |

OTHER PUBLICATIONS

Written Opinion Received for PCT Patent Application No. PCT/EP2014/063862, dated Nov. 10, 2014, 6 pages.
International Search Report received for PCT Patent Application No. PCT/EP2014/063862, dated Nov. 10, 2014, 4 pages.

* cited by examiner

DISCRETE COLOR MATCHING IN A DOCUMENT SCANNER

CROSS-REFERENCE TO RELATED APPLICATION

This application is a U.S. National Stage patent application of PCT/EP2014/063862, filed on Jun. 30, 2014, the entire contents of which are incorporated herein by reference.

This invention generally relates to optical scanning of documents. More particularly the invention relates to optical scanning of large documents by so-called large-format document scanners comprising a plurality of scanner cameras e.g. line arrays.

BACKGROUND OF THE INVENTION

Scanning of large objects, e.g. large maps or technical drawings, is conventionally performed by use of a plurality of scanner cameras as it is difficult and expensive to manufacture image sensors with dimensions sufficiently wide to cover a large document such as an A2 format, A1 format or A0 format. Examples of image sensors are charge coupled devices (CCD) or contact image sensors (CIS). The image sensors are typically arranged on a movable fixture, moving past a medium to be scanned, or the medium is pulled past the fixture by means of motor-operated rolls.

RELATED PRIOR ART

WO 2012/041390 (assigned to Contex) discloses a method of processing image data from a large-format document scanner with multiple cameras arranged in a staggered configuration such that overlap sections and non-overlap sections of image data are generated.

A difference in the responses of two cameras measured in the overlap sections also denoted an offset is used to shift the response from one of the cameras at least in the non-overlap section of that camera to counteract the offset between the two cameras.

In embodiments with more than two cameras, there may be computed two different offsets for a camera sitting between two other cameras since two overlaps are established. Interpolation may then be applied to gradually shift the response of such a camera from a shift dictated by an offset in one end to a shift dictated by an offset in the other end.

This approach reduces the effect of an offset in the response from one camera to its neighboring camera in the staggered configuration. However, it is observed that, under certain conditions, visible artifacts in color reproduction occur.

BRIEF SUMMARY OF THE INVENTION

It is realised that in large-format document scanners with multiple cameras, typically so-called line cameras, colors on a document subject to scanning are reproduced on another medium with a variance among cameras. This variance in the reproduction of the colors may be visible to the human eye only under certain lighting conditions and then only for certain colors.

One reason may be that the human eye may perceive two objectively different colors to be the same color under certain lighting conditions, whereas under other conditions they appear to the human eye as very different colors. This may be referred to by the term metamerism and may be hard to reveal by analytical steps and to take into account in a document scanner product.

The variances in the reproduction of the colors occur predominantly when a color camera is implemented by irradiating a document with differently colored light in turns, e.g. with red, green and blue light, and detecting reflected light by a mono-chromatic sensor in respective turns. Such color cameras e.g. known as Contact Image Sensors, CIS, have their own light source or light sources. The variances among the cameras may be attributed mainly to variations in the spectral distribution of the light emitted from the different light sources at what were supposed to be the same color. However, variances may also be attributed to variations in the pass band of color filters that were supposed to pass a color band e.g. passing the color 'red' in the same way. Thus variations may occur due to differences among cameras in the spectrally different reproduction of a color. The variations may also occur among different cameras with CCD sensors.

The variance may be attributed to broad or insufficiently controlled production tolerances in the manufacture of the cameras, light sources or components thereof.

Especially in large-format document scanners, where multiple cameras are used to cover a wide scan line, variations in color reproduction may stand out only under certain conditions, but then very clearly perceptible to the human eye. The variations may occur as distinct color shifts in a direction transverse to a scan line, but in an area expected to have a uniform color.

These observations have been used to arrive at the claimed invention.

There is provided a method of correcting image values recorded by a document scanner with multiple color cameras arranged with overlap scan areas; the method comprising: retrieving a first set of color image values and a second set of color image values recorded by a first camera and a second camera, respectively; wherein the first set of color image values and the second set of color image values have respective first and second overlap sets of image values, which mutually represent substantially the same scan area, and respective non-overlap sets of color image values, which represent mutually different scan areas; storing color correction values mapped to respective color index values; wherein a color correction value is computed from a color difference between a first color value and a second color value of the respective overlap sets; and correcting a third color value which is a color value from the second set of color image values by a color correction value which is looked up via a color index value determined from the third color value.

Thereby, it is possible to correct for undesired color variations in image reproductions from multiple cameras in a document scanner.

Color values expressing a difference in color reproduction between two cameras are computed from the overlapping scan area which serves as a scan reference for isolating camera-related differences in image reproduction. The difference is stored at or with a value that represents the color or a range of colors at which the difference is computed. Then and if that color or a color in that range is scanned the color reproduced by the camera is corrected by the stored difference at or with that color.

In this way it is possible to correct colors in a non-linear way and adapt color correction to the range or set of colors present in a document.

In case no difference is stored for a particular color or the difference is predefined to be zero e.g. by initialization of the storage memory, then the reproduced color is corrected, but not effectively changed since information for correction is unknown.

It is expected that the respective overlap sets of color image values, which represent substantially the same scan area, have largely similar values.

For some types of cameras the differences may be in the range of 0 to 2% up to 5% of a full-scale value which is typically determined by the bit-depth of color values.

In some embodiments a color value and a color difference are represented by a multi-component value.

A multi-component value may be a so-called RGB value, CMYK value or another color representation. The representation is used for storing values in memory and for performing computations.

In some embodiments each pixel is represented by a multicomponent color value with respective values, each with a predefined bit-depth, for each respective color.

In some embodiments color values for computing the color difference comprises a first aggregate value and a second aggregate value computed from the multiple color values of the respective overlap sets.

An aggregate value comprises a value selected from the group of: a mean value, an average value, a median value, a spatially low-pass filtered value, a maximum value, and a minimum value and a combination of these.

Thereby the color difference is based on a larger spatial area than that of a single pixel, and the subsequent color correction becomes less prone to outliers in single-pixel color values.

In some embodiments the first aggregate value and the second aggregate value is computed from a group of pixels that span substantially the full expanse of the overlap scan area or one or more portions of the overlap scan area that are mutually largely coincident to provide comparable pairs of first aggregate values and second aggregate values.

Thereby a color difference is computed on the basis of color values recorded from the same area which in turn makes the color difference express camera related effects, whereas scan area effects cancel out.

The one or more portions of the overlap scan area may have a square or rectangular shape. In some embodiments the group of pixels is selected within the overlap scan area to have scan area dimensions of about one by one millimeter. Other dimensions may be used.

In some embodiments the color values for computing the color difference comprises a first aggregate value and/or a second aggregate value computed from color values of the respective overlap sets; comprising: computing a first variance value across the first aggregate values and/or a second variance value across the second aggregate values; and using at least one of the variance values as a criterion for selectively performing the step of storing the color difference.

Thereby the method comprises a test for whether an area is sufficiently uniformly colored. The variance value, which may be a color variance value, can be considered as an indicator of whether the areas across which the aggregate values are computed have a sufficiently uniform color to reliably base a subsequent color correction on the computed color difference between color values from the respective overlap sets. Thus, the color differences that are stored are based on uniformly colored areas to provide a reliable color correction subsequently.

The variance values may be used as a criterion for performing or not performing the step of storing the color difference or computing and storing the color difference.

In some embodiments the respective overlap sets are selected from within the overlapping scan area, with multiple areas arranged adjacently along a scan line. Each area may be further subdivided into e.g. four tiles. The multiple areas may each form a basis for computing and, if relevant, storing a color difference corresponding to the color recorded in an area. The criterion for selective performing the step of storing the color difference is then based on variations found across the subdivision of an area, i.e. across the tiles. Thereby, the overlap scan area can be used to acquire color differences at multiple, differently colored areas within the overlap area. This, in turn, may lead to a more rapid color difference population in the data structure.

In some embodiments the method comprises selecting one camera or its respective set of image values as a reference, and applying correction values to image values from a neighboring camera.

In a large format scanner multiple cameras may be arranged in a staggered configuration or zig-zag pattern with multiple overlap areas along a scan line, transverse to a scanning direction. To provide a uniform color reproduction across the entire width of a scan line, correction is generally applied with respect to a neighboring camera and in cascading order from the reference camera. The reference camera may be at an outermost position at either end of a scan line in which case the corrections are applied in a cascading order towards the other end of the scan line. Alternatively, the reference camera may be at an inner e.g. central position with respect to a scan line, and the corrections are applied in a cascading order both sides out.

By selecting one camera or its respective set of image values as a reference, color values from another camera or multiple other cameras are corrected relative to color values from the camera selected as a reference. In some embodiments, color values from the camera selected as a reference are passed on without correction in this respect. It should be noted though that other types of correction as it is known in the art may be applied.

The details of mainly a single overlap are described above. In embodiments with two or more overlaps, a first overlap may be processed as described above, yielding image values from at least one of the cameras being corrected in case image values from the two cameras did not already match. That is, correction values are computed from differences between image values recorded by the respective cameras.

Image values from a third camera are corrected based on correction values that are computed from differences between corrected image values for the second camera and image values that are recorded by the third camera. In this way, image values for a fourth and further cameras are corrected correspondingly. Thereby a cascading correction is applied which ensures a uniform color reproduction across the full width of a document.

For instance if a leftmost camera is selected as a reference, color values from a neighboring camera may be corrected as described above in order to match the color values from the leftmost camera. The process of selecting color values in the overlap is generally referred to as stitching or line stitching and can be performed in different ways.

In some embodiments the method comprises progressively performing the step of retrieving the color image values, computing correction values and storing the correction values to thereby progressively load a memory with color correction values; and progressively performing the step of correcting third color values by color correction values looked up via color index values determined from respective third color values.

Thereby color correction is dynamically applied in response to the particular image values of the particular document or particular batch of documents being scanned. This is expedient since color reproduction and especially color reproduction variations among cameras depend significantly on ink type, printing method, type and quality of printing medium even within particular types of e.g. paper, etc.

In some embodiments the above step of progressively loading a memory with color correction values is performed while a single document is scanned or while scanning one or more documents in a batch of documents. In the latter event multiple documents contribute to the progressively loading of the memory with color correction values.

By performing the correcting step progressively color values can be corrected while scanning of a document takes place. Thereby, in this respect, post processing of a reproduction of the document can be significantly reduced or skipped.

In some embodiments a buffer circuit performs alignment of the image values from the cameras that are arranged in the staggered configuration such that image values arrive in segments line-by-line or in segments multiple lines by multiple lines. The above steps can be performed progressively as such segments, e.g. a line of image values, arrive or are collected from such a buffer circuit.

In some embodiments color values are corrected in a cascading order. Thereby a document can be reproduced with a uniform color presentation across the full width and thus across the full expanse of the document.

In some embodiments the method comprises retrieving a third set of color image values recorded by a third camera; updating the second set of color image values to an updated second set of color image values comprising the third color value; wherein a further color correction value is computed from a color difference between a color value of the updated second set of color image values and a color value of the third set of color image values; and correcting a fourth color value which is a color value from the third set of color image values by the further color correction value.

Thereby a document can be reproduced with a uniform color presentation across the full width and thus across the full expanse of the document. In this case, the first set of image values serves as a reference. The second set is corrected based on color deviations between the first and the second set. The third set is corrected based on the corrected second set and the third set.

Due to the nature of the color reproduction differences, it may happen that differences between a first and a second camera occur predominantly in a first range of colors, whereas differences between the second camera and a third camera occur predominantly in another range of colors.

In some embodiments the further correction value is mapped to a color index value determined from the color value of the updated second set of color image values. For the purpose of correction, the further color correction value is looked up via a color index value determined from a color value of the third set of color image values.

In a similar manner, the method can be extended to correct image values from scanners with more than three cameras.

In some embodiments the step of correcting third color values by color correction values looked up via color index values determined from respective third color values is performed when the step of retrieving the color image values, computing correction values and storing the correction values is completed for a predefined multiplicity of lines.

Thereby information for computing the color correction values can be derived from the full spatial expanse of one or more documents and the memory can be loaded with the corresponding correction values before correction is started or completed.

In some embodiments the predefined multiplicity of lines represents a substantial expanse of a document e.g. about one-fourth of a document, one-third of a document, half of the document or the full expanse of a document.

Thereby color correction values based on color values scanned only at a relatively late stage of scanning a document are stored and made available for correction at a relatively early stage of scanning the document. This in turn improves the color reproduction across a greater expanse of the document.

In some embodiments the method comprises a step of loading the storage memory with color correction values obtained by scanning a color reference sheet comprising different color sections with variations of color tones. Such a color reference sheet presents a range of colors and tones of colors.

In some embodiments the method comprises a step of translating a color value into a relatively coarsely represented color index value.

In case each color value has three color component values, like a respective color component value for Red, Green and Blue, each with N=12 bits making it possible to represent a range of $2^N=2^{12}$ values, then a relatively coarsely represented color index value may have M bits, where M<N; which gives $2^M$ index values (or bins).

Thus, a color difference stored in the data structure represents the color difference for a range of $2^{N-M}$ color values. This makes it a shorter process to populate the data structure with color differences and then in turn shortens the time until a correction can be carried out. Also, memory consumption is thereby reduced.

In some embodiments the method comprises a step of clearing first color correction values prior to storing second correction values. Thereby color correction values from a current scan or scan session are not influenced by stored color correction values from a previous scan or scan session. This makes the color correction more rapidly adapt to the properties of a document in current scan or scan session.

In some embodiments the color correction values computed from multiple overlaps are stored in respective multiple memory areas each storing correction values mapped to respective color index values. Thereby the stored color correction values are directly accessible per overlap. The multiple memory areas have a similar data structure. In some embodiments the range of color index values is identical for each overlap and is shared such that redundant storage of the range of color index values is avoided.

In some embodiments the step of storing the color correction value comprises recording a count, mapped to the color index value, of the number of times storage to the respective color index value occurs; and the color correction value to be stored is weighted by a value already stored in the storage memory according to a ratio determined from the recorded count.

However, the variance values may alternatively or additionally be used to update a color difference already stored at the color index value e.g. by a weighing scheme, wherein a smaller variance value weighs the update more heavily towards a recent value, whereas, conversely, a larger variance value weighs the update more heavily towards the already stored value.

There is also provided a data processing system having stored thereon program code means adapted to cause the data processing system to perform the steps of the above method, when said program codes means are executed on the data processing system.

There is also provided a computer program product comprising program code means adapted to cause a data processing system to perform the steps of the above method, when said program code means are executed on the data processing system.

There is also provided a computer program product according to the above method comprising a computer-readable medium having stored thereon the program code means.

There is also provided a computer data signal embodied in a carrier wave and representing sequences of instructions which, when executed by a processor, cause the processor to perform the steps of the above method.

There is also provided a document scanner system with multiple color cameras arranged with overlap scan areas; configured to: retrieve a first set of color image values and a second set of color image values by a first camera and a second camera, respectively; wherein the first set of color image values and the second set of color image values have respective first and second overlap sets of image values, which mutually represent substantially the same scan area, and respective non-overlap sets of color image values, which represent mutually different scan areas; store color correction values mapped to respective color index values; wherein a color correction value is computed by the document scanner system from a color difference between a first color value and a second color value of the respective overlap sets; correct a third color value which is a color value from the second set of color image values by a color correction value which is looked up via a color index value determined from the third color value.

In some embodiments the document scanner system comprises a document scanner configured to perform scanning and transfer image values to a computer programmed to perform computing and storing of color correction values and correction of color values.

Embodiments of the invention comprising the method steps can be implemented in digital electronic circuitry, or in computer hardware, firmware, software, or in combinations of them.

Here and in the following, the term 'processor' is intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The invention can be implemented as a computer program product, i.e. a computer program tangibly embodied on a computer-readable medium such as an information carrier, e.g. in a machine-readable storage device, for execution by, or to control the operation of, data processing apparatus, e.g. a programmable processor, a computer, or multiple computers. A computer programme, i.e. code means, can be written in any form of programming language, including compiled or interpreted languages, and it can be deployed in any form, including as a standalone program or as a module, component, subroutine, or other unit suitable for use in a computing environment. A computer programme can be deployed to be executed on one computer or on multiple computers.

BRIEF DESCRIPTION OF THE FIGURES

A more detailed description follows below with reference to the drawing, in which.

DETAILED DESCRIPTION OF THE INVENTION

Figure 1:
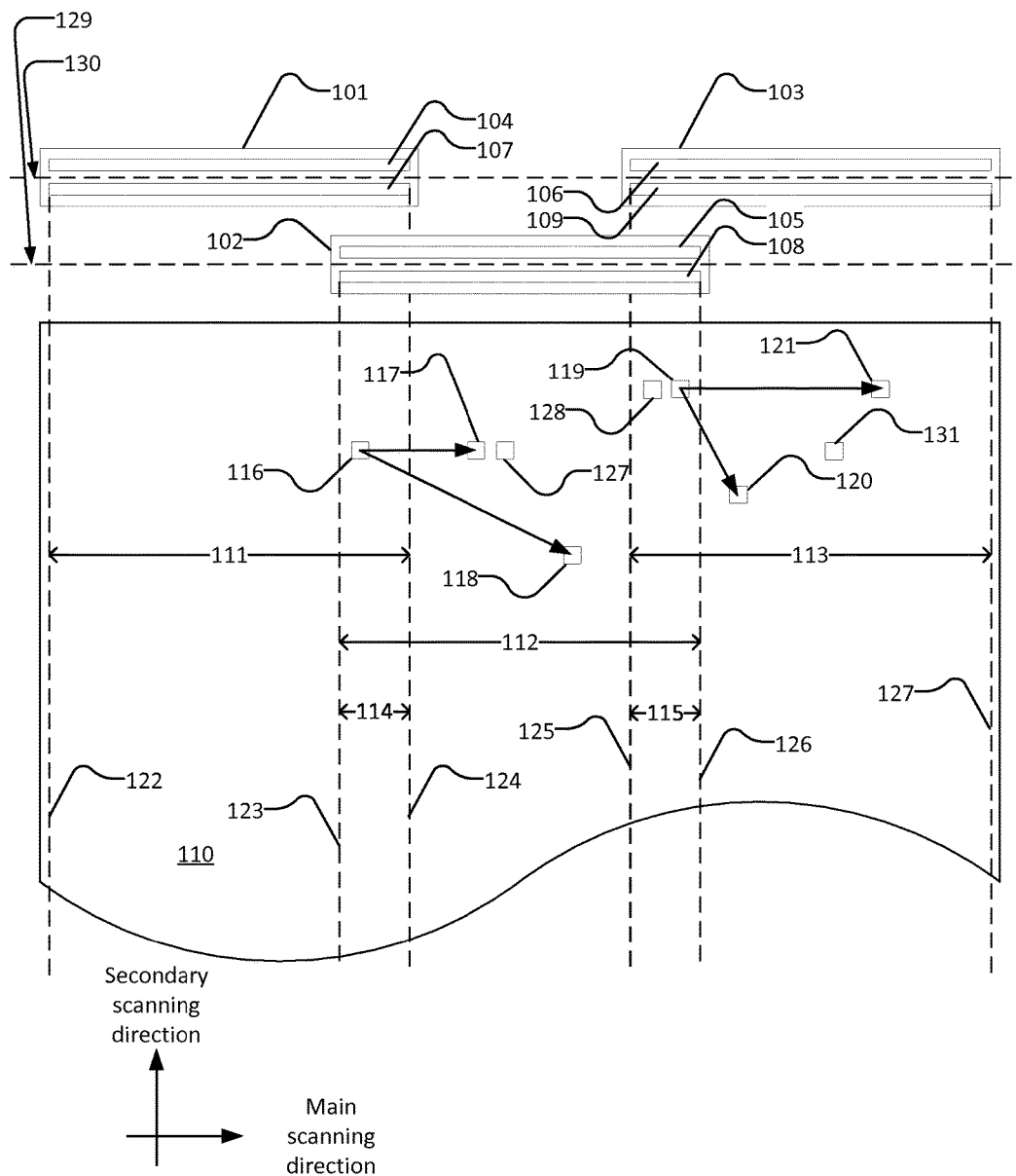
FIG. 1 shows staggered scanner cameras arranged with mutual overlap regions.

FIG. 1 shows scanner cameras arranged with mutual overlap regions in a staggered configuration. The scanner cameras 101, 102 and 103 are aligned along two parallel lines 129, 130. Starting with the leftmost camera 101, every other of the cameras are arranged along a first line (130) of the two lines; likewise, starting with the leftmost, but one camera (102), every other of the cameras are arranged along a second line (129) of the two lines. Thereby a staggered configuration for the scanner cameras is provided. This configuration is sometimes also denoted a zig-zag configuration.

To simplify the illustration only three cameras are shown, but there may be more cameras arranged in this way. There may be an even or uneven number of cameras. One of the cameras (e.g. the leftmost camera) may be selected as a reference camera from which the cameras are numbered towards the rightmost camera.

Each camera (101, 102, 103) has a line-array (107, 108, 109) of light intensity sensors (not shown). Each light intensity sensor corresponds to a picture element, pixel. As it is known in the art, the cameras are configured to output light intensity values also denoted image values for each sensor in the line-array. Also, each camera has an elongated light source (104, 105, 106) which in some embodiments comprises a light emitting source e.g. a light emitting diode, LED, arranged at one end of the camera and a light guide arranged with the light emitting source to transmit and distribute its emitted light along the extent of the line-array. In some embodiments multiple LEDs emitting respective multiple color ranges are used. The light source is a light source that by electronic control selectively emits one from multiple selectable colors e.g. red, green and blue at a time. In some embodiments the cameras are so-called Contact Image Sensors, CIS.

By repeatedly and alternatingly selecting a different one of the colors among the multiple selectable colors and interlaced therewith using the line-array to detect the light intensity, a color camera is provided which records color pixel values.

In other embodiments, the cameras are embodied with a line-array for each of the multiple colors, where at least some of the line-arrays are provided with a respective color filter. In some embodiments the cameras are based on so-called Charge Coupled Devices, CCDs. CCDs may have different spectral sensitivity and may thus also reproduce colors with a variation among CCD cameras.

In some embodiments the cameras are installed in a so-called roller scanner, where the cameras are arranged on a structure below or above a glass plate or another transparent plate, and where a document 110 subject to scanning is moved above or below the transparent plate to pass by the scanner cameras (101, 102, 103) for scanning the document 110. In another embodiment, e.g. in a so-called flatbed scanner, the scanner cameras are arranged on a moving carriage that moves across a document subject to scanning. In some embodiments of a flatbed scanner the cameras are maintained in a fixed position, whereas a moving carriage with light reflecting means, e.g. one or more mirrors, moves across the document and transmits light reflected from the document back to the cameras.

The staggered configuration of cameras makes it possible to span a wider scan line and is a well-known configuration in the art. In connection therewith it is known that, due to the staggered configuration, a physical line on the document subject to scanning is scanned at different times by every other of the cameras. Therefore, circuits and/or computer-implemented algorithms are applied to delay or align the image values from a line-array on the first line 130 relative to image values from a line-array on the second line 129 to provide a geometrically correct reproduction of a line. In the below it is assumed that such alignment, also known as stitching, is applied in addition to or with the technology described below.

Reference numeral 110 refers to a document subject to scanning. A direction along the line-arrays is denoted a main scanning direction. Scan lines extend along the line-arrays. The direction perpendicular to the main scanning direction is denoted a secondary scanning direction.

The document 110 is scanned by the first camera 101, scanning a scan area of the document 110 as illustrated by dashed lines 122 and 124 and covering a width 111. Likewise, the document, albeit another area of it, is scanned by the second camera 102, scanning a scan area of the document 110 as illustrated by dashed lines 123 and 126 and covering a width 112. Still likewise, document 110 is scanned by the third camera 103, scanning a scan area of the document 110 as illustrated by dashed lines 125 and 127 and covering a width 113. In this way the document is scanned twice at overlap areas 114 and 115.

As will be described in more detail below, a scanned area 116 located in overlap area 114, which is scanned twice (by camera 101 and 102) since it is located in the overlap area, provides two sets of color recordings, largely similar in values, that are processed to store a color correction value with respect to a reference camera for a particular color scanned in the area 116. This particular color is denoted a first particular color.

Processing is then performed to correct color values recorded by another camera 102 than the reference camera 101 where they are recorded 117; 118, but only if the color recorded is sufficiently similar to the first particular color scanned in the area 116.

A similar situation is shown in the overlap 115, where two sets of color recordings, largely similar in values are processed to store a color correction value with respect to a reference camera for a particular color scanned in the area 119. That particular color is denoted a second particular color.

In case the second particular color occurs in other areas, e.g. area 121 and/or area 120, recordings in those areas are then corrected.

A different situation is illustrated by area 128 for which a particular color is scanned twice since it is also in the overlap area 115. However, in this situation the color recorded in other areas, e.g. area 131, is not sufficiently similar to the second particular color scanned in the area 119 or any other color recorded in the overlap 115. Therefore a color recorded in the area 131 is not corrected.

More details are given below.

Figure 2:
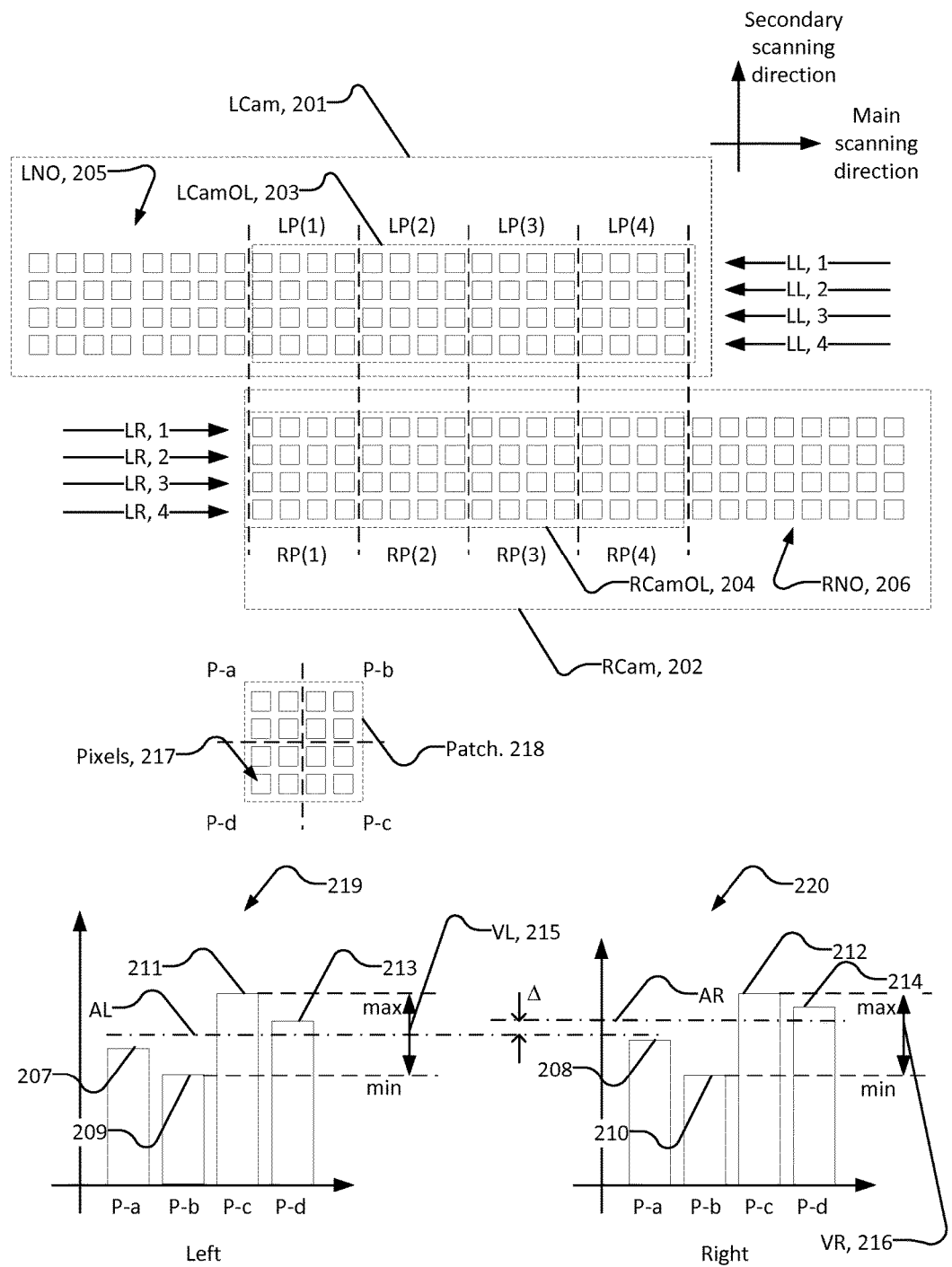
FIG. 2 shows a detailed view of an overlap region.

FIG. 2 shows a detailed view of an overlap region. In terms of image values recorded by the cameras, the overlap region comprises the image values LCamOL, 203 and RCamOL, 204 recorded across a spatial overlap area e.g. 114 or 115 where the cameras overlap in the main scanning direction. Thus, image values for a given spatial pixel in an overlap are recorded twice. Image values from non-overlapping areas are denoted LNO, 205 and RNO, 206.

A pixel or a group or cluster of pixels is shown by square boxes generally referred to by numeral 217. Four lines 1, 2, 3, 4 of image values with pixels 217 are shown. Image values from a line from a left hand side camera are denoted LL, 1; LL, 2; LL, 3 and LL, 4. Likewise, image values from a line from a right hand side camera are denoted LR, 1; LR, 2; LR, 3 and LR, 4. The four lines represent scan lines that are neighbours in the secondary scanning direction. They are aligned pairwise such that line LL, 1 overlaps with line LR, 1; line LL, 2 overlaps with LR, 2 and so forth. A group 217 of pixels may contain e.g. k-by-j pixels, where k and j are positive integers e.g. 4, 5, 8, 10, 19 or another number of pixels e.g. k=5, j=8, where, however, the extent of the overlap in the main scanning direction sets a maximum in that direction. The dimension of the overlap in the main scanning direction is determined by the mutual position and configuration of the cameras. The dimension of the overlap in the secondary scanning direction is determined by the method that processes the image values. The dimension of the overlap in the secondary scanning direction is typically determined by a parameter in software.

A section of image scan data from a left camera e.g. 101 is denoted LCam(n), 201 where n is an index counting overlaps from the leftmost camera 101 to the rightmost camera 103. Likewise, a section of image scan data from a right camera is denoted RCam(n), 202. Thus for the first leftmost overlap 114 between the two leftmost cameras 101, 102 n is equal to one, n=1. For the two leftmost cameras, but one 102, 103, n is equal to two, n=2 and so forth.

LCamOL(n), 203 and RCamOL(n), 204 hold coincident sections of image scan data from an overlap section 114 for n=1 and from overlap section 115 for n=2 and so forth up to N-1, where N is the number of cameras in the staggered configuration.

LP(1); RP(1), LP(2); RP(2), LP(3); RP(3), and LP(4); RP(4), in general referred to as a patch 218, refer to image values of coincident patches, like LP(1) is coincident with RP(1) and so forth, of image scan data selected from the same overlap section. Within an overlap section there are M patches 218, where m=1 to M. As shown there are four patches, so M=4. The image values from a left side camera are denoted LP(1), LP(2), etc., and are image values from a right side camera are denoted RP(1), RP(2), etc.

As shown, the patches 218 may cover the full area of an overlap section 203, 204. However, they may also cover a portion thereof or multiple portions of an overlap section. The overlaps may have the same number of patches or differing number of patches. A patch 218 may have a square or rectangular shape. Other shapes may also be used, although the square or rectangular shape is more easily selected programmatically.

In some embodiments a patch 218 is divided into smaller sections, tiles P-a, P-b, P-c, P-d. As shown, a patch is divided into smaller squares, but it could be divided into other overlapping or non-overlapping shapes as well. Thus, in some embodiments all patches LP(1); RP(1), LP(2); RP(2), LP(3); RP(3), and LP(4); RP(4) are divided into tiles.

A pixel is represented by a multicomponent color value, RGB, with a predefined RGB bit-depth, BD, e.g. selected from the group of: 8, 12, 16, and 24 bits giving full-scale resolution, FS, into FS=$2^B$ discrete values per color component. Thus a pixel with C colors requires C×BD bits; i.e. for three colors: 3×BD bits e.g. 3×24 bits=72 bits per pixel.

For each tile P-a, P-b, P-c, P-d from a left side camera an aggregate value, AP, e.g. AP(P-a) which designates AP for patch P-a, is computed, e.g. an average or median value across pixel color values. Thus, the computation of the aggregate value, AP, performs low-pass filtering of the pixel values. Thereby robustness against noise in the pixel values is improved.

Exemplary aggregate values, AP, of a left side camera are depicted in a diagram 219 shown to the left. A first tile P-a of the left side camera is depicted by the bar 207. A second tile P-b of the left side camera is depicted by the bar 209. Likewise, a third tile P-c by bar 211 and a fourth tile P-d by bar 213.

Generally, the diagrams 219 and 220 depict only one out of the multiple color components.

Likewise, exemplary aggregate values of a right side camera are depicted in a diagram 220 shown to the right. A first tile P-a of the right side camera is depicted by the bar 208. A second tile P-b of the right side camera is depicted by the bar 210. Likewise, a third tile P-c by bar 212 and a fourth tile P-d by bar 214.

For the left side camera, a variance VL, 215, e.g. a difference between a minimum value represented by the bar 209 and a maximum value represented by the bar 211, is computed. The variance VL is an estimate of a color variation across a patch e.g. patch LP(1).

This variance may be evaluated against a criterion e.g. a threshold value and, if the criterion is not exceeded, the color variation within the patch may be considered sufficiently uniformly colored in order for image values from the patch to be used as a basis for computing a correction value for that particular color. Thereby more reliable color correction values may be computed. On the contrary, if the color variation is not sufficiently uniformly colored, the patch is discarded with respect to computing a correction value.

In case the patch 218 is determined to be sufficiently uniformly colored, processing may proceed by performing similar operations for the right hand side camera with exemplary aggregate values shown in the right hand side diagram 220.

A further more aggregate value AL is then computed across the patch from the left hand side camera and, likewise, an aggregate value AR is then computed across the patch from the right hand side camera.

The difference between AL and AR is denoted Δ and Δ=AL minus AR. This difference Δ is used as a correction value, but only for correcting color values closely similar to the color, AL, at which Δ was computed.

Thus, a first aggregate value AP is computed for each of the tiles (P-a, P-b, P-c, P-d) to improve robustness against noise in determining variance (VR, 216; VL, 215) within the patch 218. Then a second aggregate value (AL, AR) is computed from a first and a second overlap set to in order to verify whether the color is sufficiently uniform within the patches to reliably match the response of two overlapping cameras by correcting the image values of one of the cameras by the difference between the second aggregate values (AL, AR) of the two cameras. Thereby a color shift among two cameras can be eliminated. In general one of the two cameras will be a reference camera and its image values are in general not corrected, whereas image values from its neighboring camera will be corrected to match the image values from the reference camera. In some embodiments both cameras are corrected e.g. to match at a value between AL and AR.

Since the overlap section comprises four patches, there may ideally be computed four correction values for a particular overlap region.

The correction values are stored in a volatile or non-volatile memory, denoted ΔMEM. In some embodiments ΔMEM stores a table with a first column with index values and a second column with correction values, where the index values are a component value with e.g. three components, one for each of three colors. In embodiments with multiple overlaps there are respective multiple memories ΔMEM, where correction values are respectively stored or looked up. More conveniently, in some embodiments the memory space across which the correction values are stored is used as index values. Then, a color value is converted to a memory address at which the color correction value is looked up or stored as the case may be.

The details of mainly a single overlap are described above. In embodiments with two or more overlaps, a first overlap may be processed as described above, yielding image values from at least one of the cameras being corrected in case image values from the two cameras did not already match. That is, correction values are computed from differences between image values recorded by the respective cameras.

Image values from a third camera are corrected based on correction values that are computed from differences between corrected image values for the second camera and image values that are recorded by the third camera. In this way, image values for a fourth and further cameras are corrected correspondingly. Thereby a cascading correction is applied which ensures a uniform color reproduction across the full width of a document.

In some embodiments an index value, Idx, is represented by a shorter bit-width, iB, than the RGB bit-depth, BD, e.g. reduced by q bits to iB=B−q, where q is selected from the group of: 3, 4, 5, and 6. In some embodiments the index value has as many bits per color as the RGB bit-depth.

Based on this terminology, a flowchart for the correcting color shifts is described below.

Figure 3:
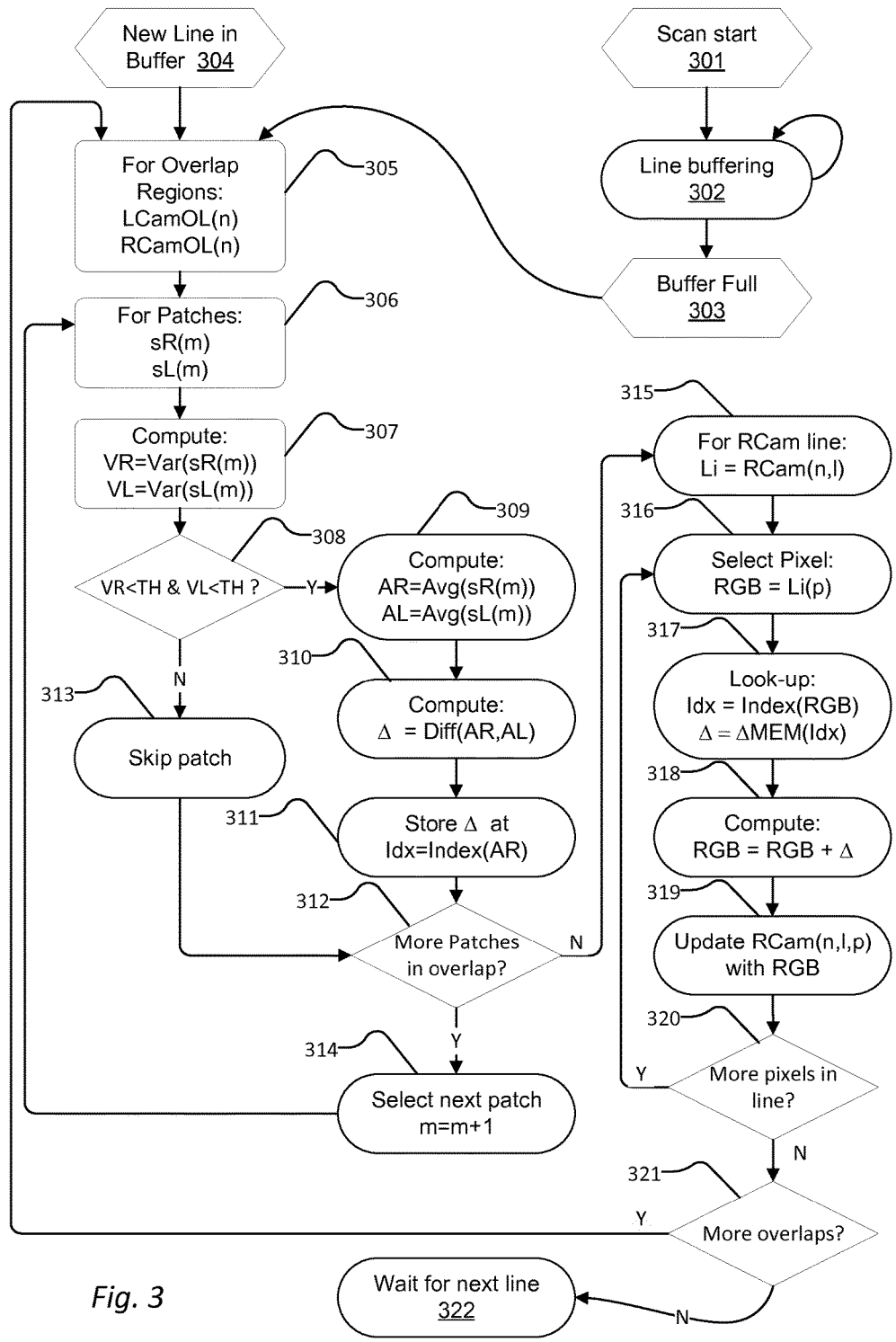
FIG. 3 shows a flowchart for correcting color shifts among cameras in an optical scanner.

FIG. 3 shows a flowchart for a method of correcting color shifts among cameras in an optical scanner. The method starts in step 301 wherein scanning of a document is started and then proceeds to step 302 wherein first lines are buffered into a so-called ring-buffer.

Then, after buffering a number of lines into the buffer (which may be a so-called ring-buffer also known as a circular buffer sometimes abbreviated an O-Buffer) in step 302, step 303 responds to the buffer being full and the method continues in step 305 where overlap regions LCa-mOL(n) and RCamOL(n) of the image values in the ring-buffer are selected for a first overlap i.e. n=1.

Continuing, in step 306 image values for patches denoted sR(m) and sL(m) in the overlap are selected for a first patch i.e. m=1.

Then, in step 307 the variance VL across respective patch is computed as described above. Expressions for the computations may be formulated as follows:

$$VL = \begin{bmatrix} AL_R \\ AL_G \\ AL_B \end{bmatrix} = \mathrm{Var}(sL(m))$$

$$VR = \begin{bmatrix} AR_R \\ AR_G \\ AR_B \end{bmatrix} = \mathrm{Var}(sR(m))$$

wherein Var( ) is a function for computing variance value e.g. as mentioned in connection with FIG. 2. VL and VR are vectors with respective elements for each color red, green and blue.

In some embodiments both VL and VR are computed in step 307. Based on the computed variance VL and optionally also VR, the variances are evaluated against a threshold criterion in step 308. The criterion may be formulated as the following logical expression:

$$VR < TH \ \& \ VL < TH?$$

wherein TH is a predefined threshold value and '&' is a logical and- operator. In case the expression evaluates to 'true', the variance across both the left hand side patch and the right hand side patch are uniformly colored. Color correction may then be based on those patches. As a result thereof the method continues in step 309 wherein an aggregate value AL, AR for the left hand side patch respectively the right hand side patch is computed. Expressions for the computations may be formulated as follows:

$$AL = \begin{bmatrix} AL_R \\ AL_G \\ AL_B \end{bmatrix} = Avg(sL(m))$$

$$AR = \begin{bmatrix} AR_R \\ AR_G \\ AR_B \end{bmatrix} = Avg(sR(m))$$

wherein Avg( ) is a function for computing the aggregate value e.g. as mentioned in connection with FIG. 2. AL and AR are vectors with respective elements for each color red, green and blue.

Next, in step 310 the difference, denoted Δ, between AR and AL is computed as a vector value:

$$\Delta = \begin{bmatrix} \Delta_R \\ \Delta_G \\ \Delta_B \end{bmatrix} = \begin{bmatrix} AR_R \\ AR_G \\ AR_B \end{bmatrix} - \begin{bmatrix} AL_R \\ AL_G \\ AL_B \end{bmatrix}$$

Also, an index, Idx, is computed as a vector value. The index idx is computed by a function Index:

$$Idx = \begin{bmatrix} Idx_R \\ Idx_G \\ Idx_B \end{bmatrix} = \mathrm{Index}(AR)$$

In some embodiments the index is equal to the integer part of AL divided by $2^{R=5}$. Thereby, the required memory capacity for storing the differences or correction values is reduced by a factor of 32 compared to the situation where the full scale span of values of AL could be stored.

Thus, by step 311 both the correction value Δ and the index Idx are computed, both on a vector form.

Subsequently, the correction value Δ is stored in step 311 at or with index Idx in a data memory. The correction value may be stored in a one-to-one relation with the index Idx or at a memory address being or being determined by the index value Idx.

The method then proceeds to step 312 to determine whether there are more patches in the overlap to process. In the positive event, the method proceeds to step 314 for preparing to select the next patch m=m+1, wherefrom the method reverts to step 306 to select the next patch. In case the result of the evaluation in step 308 is false, i.e. the color variation across the patch is not sufficiently small, the patch is skipped in step 313 since it is not a good basis for computing a correction value. By means of step 314, a loop is closed which iterates across the patches within an overlap section.

As mentioned it is determined in step 312 whether there are more patches in the overlap to process. In the negative event thereof the method proceeds to step 315 where a line, Li, in RCam(n) image values is selected. Next, in step 316, a pixel value, RGB, is selected from the line Li.

Then, in step 317 the storage memory is looked up by, firstly, computing an index value based on the RGB value and then, secondly, using that index to lookup a correction value Δ. The correction value is read from the memory. The correction value may be computed and stored as described above in connection with steps 310 and 311. Alternatively, the correction value may stem from an initialisation of the memory, e.g. initialized to the value zero in which case correction makes no effective difference.

Correction is performed in step 318 wherein the RGB value is set to the RGB value plus the correction value Δ. Then in step 319 the RGB value in the RCam image values is updated i.e. for the selected camera n+1, at the selected line, l, and at the selected pixel, p.

The details of mainly a single overlap are described above. In embodiments with two or more overlaps, a first overlap may be processed as described above, yielding image values from at least one of the cameras being corrected in case image values from the two cameras did not already match. That is, correction values are computed from differences between image values recorded by the respective cameras.

Image values from a third camera are corrected based on correction values that are computed from differences between corrected image values for the second camera and image values that are recorded by the third camera. In this way, image values for a fourth and further cameras are corrected correspondingly. Thereby a cascading correction is applied which ensures a uniform color reproduction across the full width of a document. The corrected image values are carried over by updating the RCam values with the RGB value for image values in RCam in step 319.

Thereby corrected image values are carried to the right, using the leftmost camera as a reference camera. Similarly, the rightmost camera could be used as a reference, carrying corrected image values to the left by updating LCam. Thereby a cascading correction is applied which ensures a uniform color reproduction across the full width of a document.

By means of step 320 the method verifies whether there are more pixels in the selected line and, in the positive event thereof (Y), the method resumes step 316 for a next pixel in the line. In the negative event (N), the method proceeds to step 321 to verify whether there are more overlap sections to process. In the positive event thereof the method resumes in step 305 to select the next overlap region, whereby a loop is closed. In the negative event (N), the method waits in step 322 for the next line to arrive in the ring-buffer.

Figure 4:
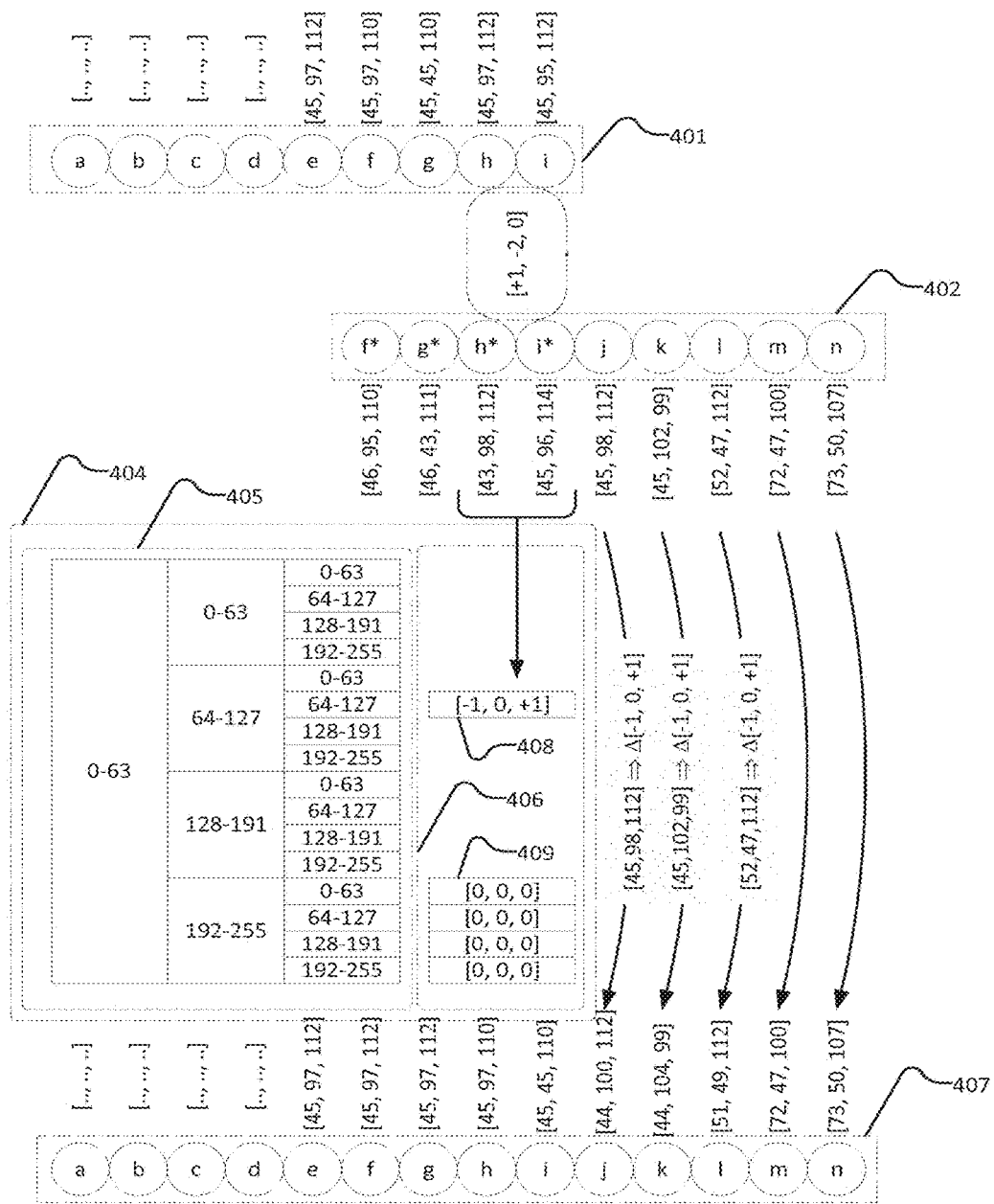
FIG. 4 shows a simplified example of computing correction values and correcting color shifts among cameras.

FIG. 4 shows a simplified example of computing correction values and correcting color shifts among cameras. The example uses a bit-depth of 8 bits per color giving a full scale range of 256 values per color.

The circles designated with lower case letters 'a', 'b', 'c', . . . 'i' represent groups of pixels from a left hand side camera 401, where the groups 'a' to 'e' are from a non-overlap region and where groups 'f' to 'i' are from an overlap region. Likewise, for a right hand side camera 402, circles designated with lower case letters 'f*', 'g*', 'h*', 'i*' represent groups of pixels from an overlap region and groups 'j', 'k', 'l', 'm' and 'n' represent groups of pixels from a non-overlap region.

The numbers shown above and below the circles represent color values for a respective group of pixels. The color values are shown in vector representation with three elements e.g. for group 'e': [45, 97, 112], which for a red-green-blue color scheme means that red is represented by the value 45, green by 97 and blue by 112.

A first left hand side patch of image values in the overlap region is represented by the groups of pixels 'f' and 'g' and the corresponding right hand side patch is represented by the groups of pixels 'f*' and 'g*'. The color values are for:

'f'=[45,97,110], and

'g'=[45,45,110]

Thus, in this case there is a substantial variance in the second color component '97' versus '45'. The threshold for assuming that there is a uniform color within a patch represented as an example be TH=5. The variation '97' versus '45' exceeds this threshold. Therefore, the patch represented by 'f' and 'g' is skipped for the purpose of computing a color correction value.

Turning to a second left hand side patch represented by the groups of pixels 'h' and 'i' and the corresponding right hand side patch represented by the groups of pixels 'h*' and 'i*' the color values are:

'h'=[45,97,112];'i'=[45,95,112], and

'h*'=[45,98,112];'i*'=[46,96,112]

This variance within the left hand side patch is much smaller and would not exceed the threshold of TH=5 as given above. Therefore this patch can be used for computing a color correction value. The right hand side patch may also be used as a criterion and would in this case confirm the finding that the patch can be used for computing a color correction value.

An aggregate value of the left hand side patch would be based on 'h'=[45, 97, 112] and 'i'=[45, 95, 112] giving an average of AL=[45, 96, 112]. For the right hand side patch: 'h*'=[43, 98, 112] and 'i*'=[45, 96, 114] giving an average of AR=[44, 96, 113].

Thus the difference is Δ=AR−AL=[−1, 0, 1], which can be used as a color correction value 408.

The correction value is then stored in memory 404. Memory 404 has an index portion 405 with three components shown as columns, one for each color component. The index is reduced by a factor of $64=2^6$ for each color. Thus, a color correction value is for each color stored in one of four bins.

It should be noted that the portion 406 storing correction values in the memory 404 may be initialized with zeroes 409. Thereby correction steps can be performed in the same way for all pixels irrespective of whether a correction value was computed for the color value of a pixel.

Recalling AL=[45, 96, 112] the computed difference Δ=[−1, 0, 1] will be stored in 406 at the first of the four bins for the first color since 0<45<63; at the second bin for the second color since 64<96<127; and at the second bin for the third color since 64<112<127. Especially for larger bit-depths this scheme provides an efficient reduction of the consumed memory for storing correction values. Even more importantly, the storage memory storing the correction values will be filled more quickly which in turn improves chances that a non-zero correction value is looked up and that effective correction can be carried out.

Turning to the non-overlapping section with groups 'j', 'k', 'l', 'm' and 'n', the computed and stored correction value can be applied where a sufficiently similar color is scanned. A sufficient similar color is scanned in groups 'j', 'k', and 'l' since color values from those groups addresses the computed color correction value Δ=[−1, 0, 1] in the memory 404.

The color values of groups 'j', 'k', 'l', 'm' and 'n' are therefore corrected accordingly by adding the correction value Δ=[−1, 0, 1]. The result for groups 'j', 'k', 'l', 'm' and 'n' can be seen in the output 407.

The color values from groups 'm' and 'n' in the non-overlapping section will not address the correction value Δ=[−1, 0, 1] since for 'm': 72>63 and for 'n': 73>63. The color values from groups 'm' and 'n' may address another value e.g. zero i.e. Δ=[0, 0, 0] in case no correction value was computed. The color values from groups 'm' and 'n' are therefore not effectively corrected in the output 407.

Color values from groups 'a' to 'i' of the left hand side camera may go directly to the output 407 without correction since the left hand side camera is selected as a reference camera.

Figure 5:
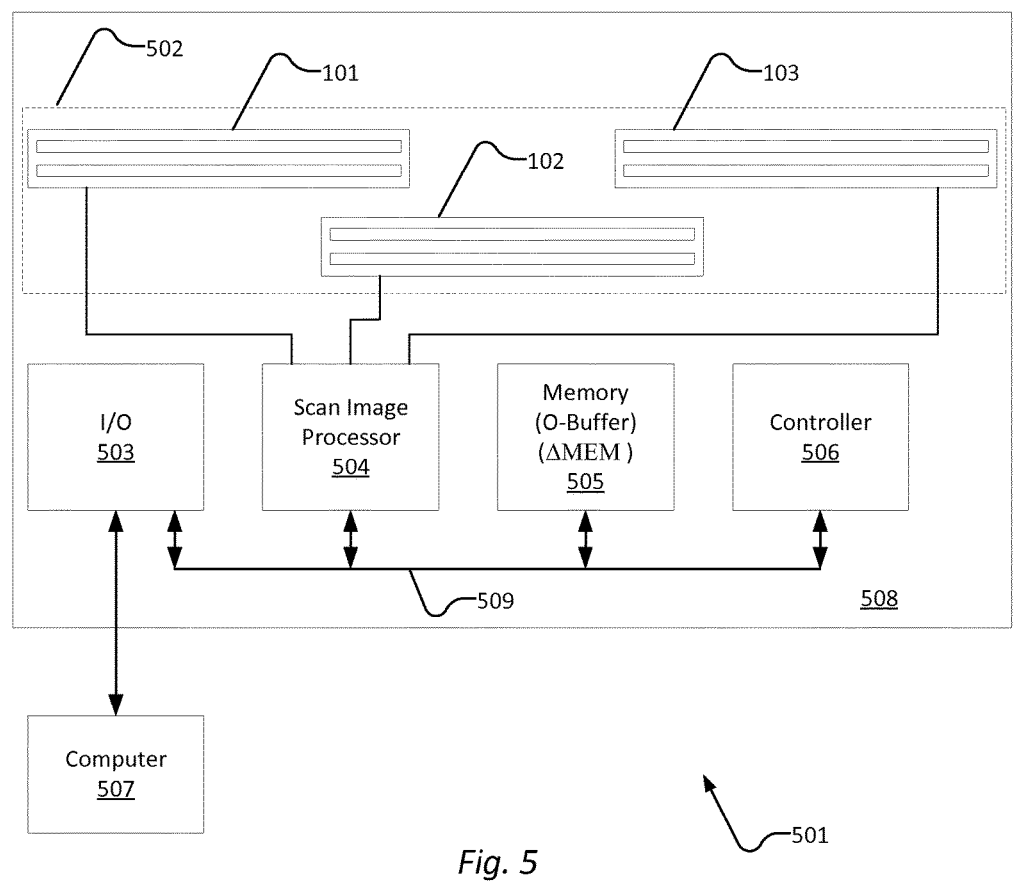
FIG. 5 shows a block diagram for a document scanner.

FIG. 5 shows a block diagram for a document scanner. The document scanner 501 comprises a structure (e.g. a carriage) 502 carrying the cameras 101, 102 and 103. Color image values from the cameras 101, 102 and 103 are read out by means of a Scan Image Processor 504 which stores the image values in a ring-buffer (O-Buffer) in a memory 505.

In some embodiments the Scan Image Processor 504 performs the method as described above. Processed and corrected image values are then made available for retrieval or upload to a computer 507, e.g. a general purpose computer for further image processing, archiving, modification etc. as the case may be.

Alternatively, or additionally, in some embodiments the image correction method described above is performed on a computer 507, e.g. a general purpose computer programmed to perform the method. In such embodiments the scanner 509 is configured to transfer image values recorded by the cameras to the computer 507 via the I/O unit 503 as image values are recorded and while scanning of a document takes place e.g. line-by-line or in packets of image values. Concurrently, while the transfer of image values proceeds and while the document is being scanned, the computer processes image values according to the image correction method described above. This is also denoted live color correction. Thereby, processed image values i.e. a digital reproduction of the document scanned can then be made available for archiving, further processing, etc., very quickly after the scan of the physical document is completed.

Alternatively, or additionally, in some embodiments the image correction method described above is also performed on a computer 507 and the scanner 509 is configured to transfer image values recorded by the cameras to the computer 507 via the I/O unit 503 as image values are recorded and while scanning of a document takes place, e.g. line-by-line or in packets of image values. However, image values are then processed according to the image correction method above, when all or substantially all image values recorded from a document have been transferred to the computer 507. This is also denoted post-processing color correction. The advantage thereof is that the memory storing the correction values (ΔMEM) can be fully loaded with all possible correction values available from the scan of the document before correction starts. Thereby, correction is made more effective especially in those areas of a reproduced document that were scanned earliest compared to those areas of a reproduced document that were scanned most recently latest.

The Scan Image Processor 504 performs among other tasks stitching of image values.

An I/O unit 503 provides communication, comprising transfer of image values, with the computer 507. In some embodiments the unit provides communication via a data network e.g. according to the Ethernet protocol, USB protocol, Firewire protocol or via another communications protocol.

Communication within the scanner 508 among the units 503, 504, 505 and 506 takes place mainly via a communications bus 509.

A controller 506 performs control of the scanner's operation e.g. roller feeding of the document etc. This is known in the art.

In general, image values may also be denoted image data.

The invention claimed is:

1. A method of correcting image values recorded by a document scanner with multiple color cameras arranged with overlap scan areas, the method comprising:
   retrieving a first set of color image values and a second set of color image values recorded by a first camera and a second camera, respectively,
      wherein the first set of color image values and the second set of color image values have respective first and second overlap sets of color image values, which mutually represent substantially the same scan area, and respective non-overlap sets of color image values, which represent mutually different scan areas, the color image values each comprising multiple color component values;
   storing multiple color correction values mapped to respective color index values, wherein each color index value comprises or is computed from the multiple color component values of the color image values of the respective overlap sets, and wherein each of the multiple color correction values mapped to a respective color index value comprises multiple color component values and is computed from a color difference between a first color value and a second color value of the respective overlap sets; and
   correcting a third color value which is a color value from the second set of color image values by a color correction value which is looked up via a color index value determined from the third color value.

2. A method according to claim 1, wherein color values for computing the color difference comprise a first aggregate value and a second aggregate value computed from the multiple color values of the respective overlap sets.

3. A method according to claim 1, wherein the color values for computing the color difference comprise at least one of a first aggregate value and a second aggregate value computed from color values of the respective overlap sets, comprising:
   computing at least one of a first variance value across the first aggregate value and a second variance value across the second aggregate value; and
   using at least one of the first and second variance values as a criterion for selectively performing the step of storing the color difference.

4. A method according to claim 1, comprising:
   selecting one camera or a respective set of image values as a reference, and applying correction values to image values from a neighboring camera.

5. A method according to claim 1, comprising:
   progressively performing the step of retrieving the color image values, computing correction values and storing the correction values to thereby progressively load a memory with color correction values; and
   progressively performing the step of correcting third color values by color correction values looked up via color index values determined from respective third color values.

6. A method according to claim 1, wherein color values are corrected in a cascading order.

7. A method according to claim 1, comprising:
   retrieving a third set of color image values recorded by a third camera;
   updating the second set of color image values to an updated second set of color image values comprising the third color value;
   wherein a further color correction value is computed from a color difference between a color value of the updated second set of color image values and a color value of the third set of color image values;
   correcting a fourth color value which is a color value from the third set of color image values by the further color correction value.

8. A method according to claim 1, wherein the step of correcting third color values by color correction values looked up via color index values determined from respective third color values is performed when the step of retrieving the color image values, computing correction values and storing the correction values is completed for a predefined multiplicity of lines.

9. A method according to claim 1, comprising a step of loading the storage memory with color correction values obtained by scanning a color reference sheet comprising different color sections with variations of color tones.

10. A method according to claim 1, comprising a step of translating a color value into a coarsely represented color index value.

11. A method according to claim 1, comprising a step of clearing first color correction values prior to storing second correction values.

12. A method according to claim 1, wherein color correction values computed from multiple overlaps are stored in respective multiple memory areas each storing correction values mapped to respective color index values.

13. A method according to claim 1, wherein the step of storing the color correction value-comprises recording a count, mapped to the color index value, of the number of times storage to the respective color index value occurs; and wherein the color correction value to be stored is weighted by a value stored in the storage memory according to a ratio determined from the recorded count.

14. A data processing system having stored thereon program codes adapted to cause the data processing system to perform the steps of the method according to claim 1, when said program codes are executed on the data processing system.

15. A non-transitory computer-readable medium having instructions stored thereon that, when executed by a data processing system, causes the data processing system to perform the steps of the method according to claim 1.

16. A document scanner system with multiple color cameras arranged with overlap scan areas configured to:
retrieve a first set of color image values and a second set of color image values by a first camera and a second camera, respectively,
wherein the first set of color image values and the second set of color image values have respective first and second overlap sets of color image values, which mutually represent substantially the same scan area, and respective non-overlap sets of color image values, which represent mutually different scan areas, the color image values each comprising multiple color component values for the respective color components;
store multiple color correction values mapped to respective color index values,
wherein each color index value comprises or is computed from the multiple color component values of the color image values of the respective overlap sets, and wherein each of the color correction values mapped to a respective color index value comprises multiple color component values and is computed by the document scanner system from a color difference between a first color value and a second color value of the respective overlap sets; and
correct a third color value which is a color value from the second set of color image values by a color correction value which is looked up via a color index value determined from the third color value.

17. A method of correcting image values recorded by a document scanner with multiple color cameras arranged with overlap scan areas, the method comprising:
retrieving a first set of color image values and a second set of color image values recorded by a first camera and a second camera, respectively,
wherein the first set of color image values and the second set of color image values have respective first and second overlap sets of color image values, which mutually represent substantially the same scan area, and respective non-overlap sets of color image values, which represent mutually different scan areas;
storing color correction values mapped to respective color index values, wherein a color correction value is computed from a color difference between a first color value and a second color value of the respective overlap sets;
correcting a third color value comprising a color value from the second set of color image values by a color correction value, which is looked up via a color index value determined from the third color value; and
clearing first color correction values prior to storing second correction values.

18. A method of correcting image values recorded by a document scanner with multiple color cameras arranged with overlap scan areas, the method comprising:
retrieving a first set of color image values and a second set of color image values recorded by a first camera and a second camera, respectively,
wherein the first set of color image values and the second set of color image values have respective first and second overlap sets of color image values, which mutually represent substantially the same scan area, and respective non-overlap sets of color image values, which represent mutually different scan areas;
storing color correction values mapped to respective color index values,
wherein a color correction value is computed from a color difference between a first color value and a second color value of the respective overlap sets,
wherein storing the color correction value comprises recording a count, mapped to the color index value, of the number of times storage to the respective color index value occurs, and
wherein the color correction value to be stored is weighted by a value already stored in the storage memory according to a ratio determined from the recorded count; and
correcting a third color value which is a color value from the second set of color image values by a color correction value which is looked up via a color index value determined from the third color value.

* * * * *